INVENTOR
Einar H. Palmason

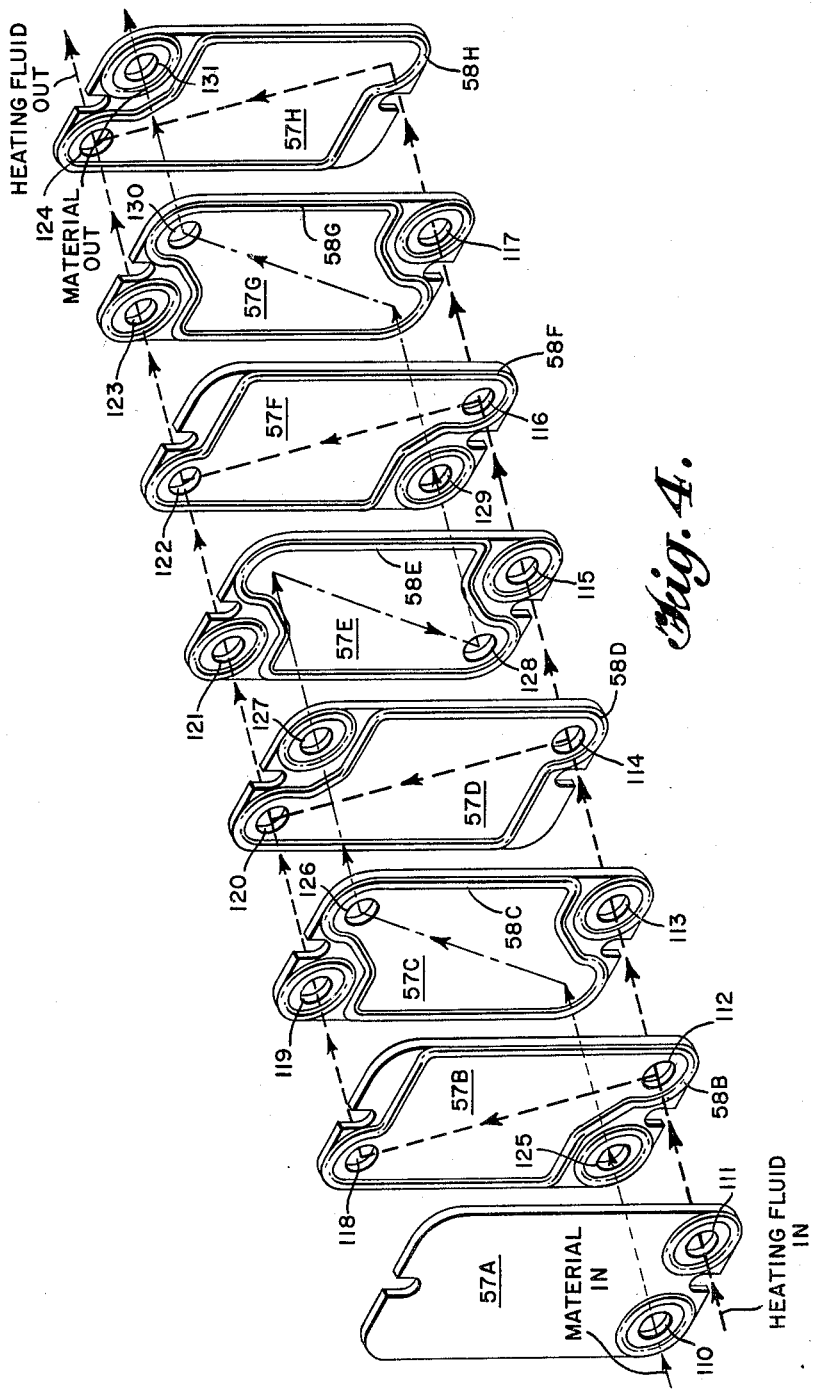

United States Patent Office 3,073,380
Patented Jan. 15, 1963

3,073,380
CONCENTRATION OF FOAMING MATERIALS
Einar H. Palmason, Fort Lauderdale, Fla., assignor to Parkson Industrial Equipment Company, Fort Lauderdale, Fla., a corporation of Florida
Filed Mar. 27, 1962, Ser. No. 182,762
6 Claims. (Cl. 159—49)

This invention relates to the evaporation of volatile components from liquid-containing materials with foaming characteristics. More particularly, the invention relates to effecting rapid vaporization of volatiles from foaming material by passing the material between heated surfaces, closely spaced from each other to form a continuous passageway, the treatment being effected without adversely affecting the physical characteristics of the vapor or the material exiting from the passageway.

This application is a continuation-in-part of my copending applications for Letters Patent, Serial Nos. 788,215, 788,231 and 788,232, all filed January 21, 1959, and now abandoned.

Many materials have tendencies to foam when a portion of their volatile constituents are rapidly vaporized as the temperature of the material is increased above ambient.

In the art involving the rapid concentration of materials of the type referred to, it has been the practice to confine the material and to apply heat thereto to permit vapor to form for subsequent removal.

Although methods of evaporation such as air and tray drying have commercial application, most evaporators now in this service employ calandria type heat exchangers which allow free passage of the material and unrestricted conversion of sensible heat to latent heat for the formation of vapor. In order to accomplish this, completely unrestricted passages are required to prohibit build-up of back pressure. Due to the openness of the system, the vapor is allowed to leave its concentrate as it is generated. The material thus left behind progressively concentrates.

Since the above-referred to system, when used to evaporate certain materials, results in fouling of the heat exchange surfaces, another system of evaporation is regularly employed with such materials whereby the evaporation is effected by flashing. In the flash type evaporator, the material is confined in the heat exchange zone but sufficient pressure is maintained in the system to prevent the vapor from forming. This material is then sprayed or otherwise discharged into a chamber of lesser pressure which allows the vapor to form by "Flash." A system of this type need not be unrestricted in flow. In fact, considerable restriction in passageways is advantageous to maintain sufficient pressure to prevent vaporization taking place in the heated zone. With these conditions, high heating surface to mass flow ratios can be used, i.e., narrow, elongated sections.

From the foregoing, it will be seen that the "open" system, when used to evaporate a fouling type of material, is impracticable and that the "flash" system, when used to evaporate a foaming material is inefficient, and yet has been the most effective heretofore available.

This invention overcomes the disadvantages of both commonly used systems while retaining the major advantages of each, and consists of a continuous process for the evaporation of volatiles from normally foam forming materials without foaming, whereby rapid separation of the vapors from the concentrate is permitted. It comprises passing the material to be treated through a tortuous path of relatively narrow elongated cross-section at high velocity, supplying heat to the material to effect volatilization thereof during its confinement, and continuing to pass in homogeneous mixture the concentrate and vapors through the tortuous path while continuing to supply heat thereto. The rate of velocity of the mixture through the path is maintained so that deposition of concentrate upon the surfaces which defines the passageway is inhibited and the product is discharged from the end of the path with the vapors above ambient temperature, which prevents foaming of the product and permits the resultant rapid separation of vapors from the concentrate.

This invention contemplates that effective evaporation is a function of rate of flow of material, surface area of the confining heated wall of the passageway, and the heat applied through the heated wall. It follows that if the flow rate is high and temperature input low, vapor will not be allowed to form within the heated section and flash evaporation will occur with subsequent foaming at the point of exit. The other extremes of rate of flow and temperature are controlled by the heat sensitivity of the material. Both the upper and lower limits of rate of flow and heat input, however, are affected by the critical ratio of heating surface and volume of material confined by the heated surface.

More specifically, this invention contemplates an operation within a formula wherein, in denoting the heat exchange surface in square feet per foot of length of one passageway as "$S$," and denoting volume contained as cubic feet within these heated surfaces as "$V$," the results are obtained by using the ratio of $S/V$ of at least 8.0. Actually, the preferred ratio $S/V$ for any single passageway is over 20.

The rate or velocity of flow is controlled initially by pump or differential pressure and by restricting the cross-section of passageway. Further control is induced by the rate of heat input and hence, the rate at which vapor is generated in turn increasing volume and velocity of material through the passageway.

One method of obtaining the conditions necessary for this process is by using a thin gasketed plate as the confining wall of the heated passageway.

Additional objects will become apparent from an examination of the drawings, description and claims.

The invention will be described further in connection with the accompanying drawings, which are to be considered as an exemplification of the invention and do not constitute limitation thereof.

In the drawings:

FIGURE 4 is a diagrammatic view showing a plurality of evaporator plates together with essential terminal plates to maintain them in operative position, as indicated, and assembled in such a manner as to illustrate how a series of plate passes can be arranged.

Figure 1:
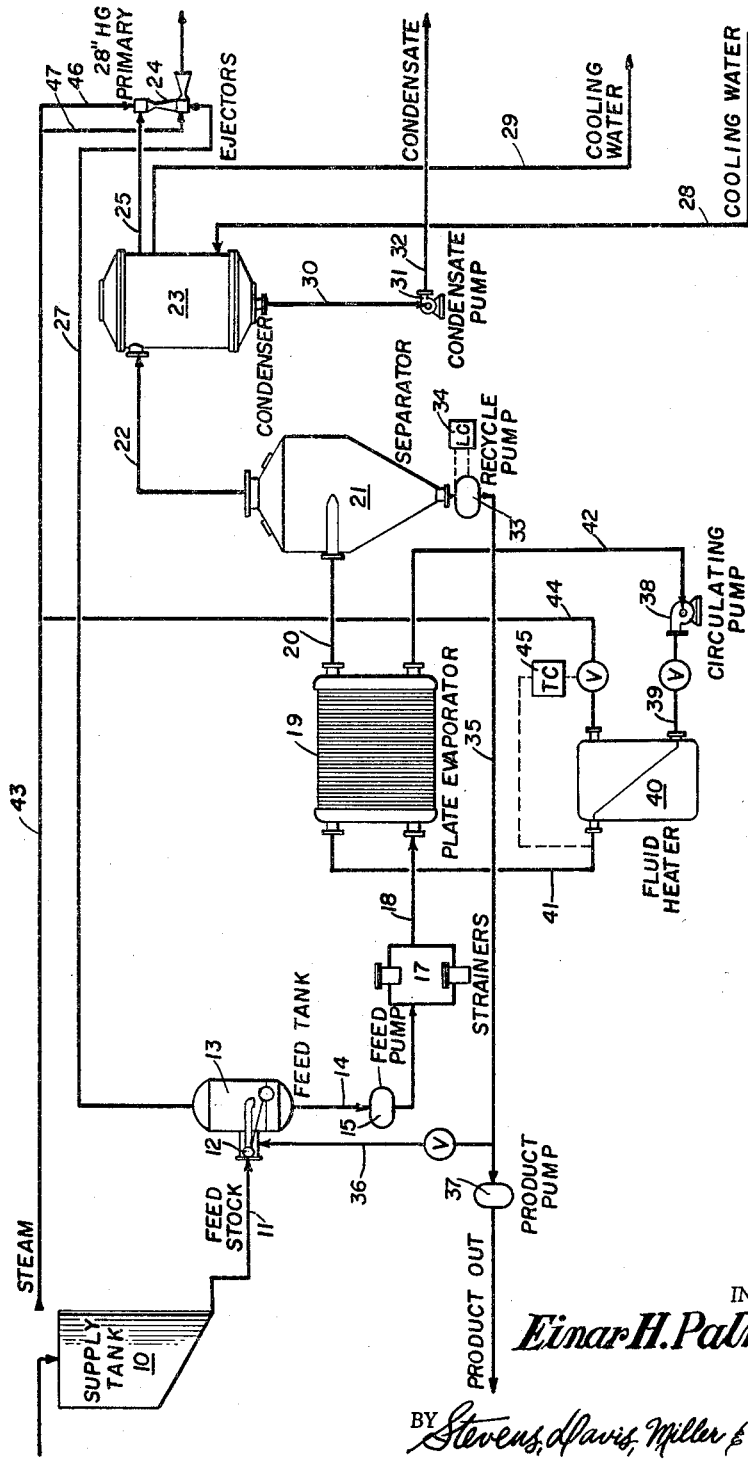
FIGURE 1 is a typical arrangement of the evaporator system of this invention showing a feed tank, an evaporator plate unit, a separator for separating the vapor from the concentrated material, and the recycling of part of the concentrated material to the feed tank.

In the drawings, FIGURE 1 illustrates a typical plate-type evaporator system of this invention. The system has a supply tank 10 which feeds material to be evaporated through line 11 controlled by float valve 12. The material passing through the float valve 12 is passed from the valve into a feed tank 13, which is maintained under vacuum. The level of the material in the feed tank is maintained constant by the float valve 12 which automatically opens as the level drops or closes as the level rises. The material from the feed tank is passed from line 14 into a variable speed pump 15 which conveys the material through line 16 to strainer 17 where any foreign matter is removed therefrom. The material from the strainer is passed through line 18 into a plate evaporator 19 where the material undergoes evaporation as it passes between plates forming the passageway to be hereinafter more fully described. The material passing through the evaporator, in homogeneous mixture with the vapor formed from it, exits through line 20 into separator 21 which is maintained under vacuum, whereby the vapor is isolated from the material. The vapor is drawn off through line 22 into a condenser 23 by a dual vacuum ejector 24 which draws the vacuum on the condenser through connecting line 25. One section of the dual vacuum ejector 26 draws the vacuum through line 27 on the feed tank 13. Thus, it will be seen that the separator through the dual ejector is maintained under a lower absolute pressure than is the feed tank. The vapor is condensed by cooling water which enters the condenser 23 through line 28 and exits therefrom through line 29. The condensate formed in the condenser exits through line 30 and is drawn off by condensate pump 31 through line 32.

The material from the bottom of separator 21 is removed by a recycle pump 33 with the heighth of the material in the leg of the bottom of the separator being controlled by a conventional level controller 34 which speeds up the recycle pump as the level exceeds a certain height. The material from the recycle pump passes through line 35 where a controlled portion of it is tapped off through line 36 and reenters feed tank 13 as recycled concentrated material which mixes with incoming fresh feed to make a mixture of the correct volatile content. Thus, the recycle insures that the desired concentration is reached in a single pass through the system. The remaining portion of concentrated material from the recycle pump is removed from the system through a variable speed product pump 37 and discharged as dried product.

The fluid for heating the plates of the evaporator is circulated by a pump 38 through line 39 into a heater 40. The fluid thus heated then passes through line 41 into the plate evaporator 19 where it circulates through the evaporator heating spaces between the plates, the specific operation of which will be hereinafter more fully described. The heating fluid exits from the evaporator through line 42 where it enters the pump 38 for passage to the heater for reuse. A line 43 supplies the steam for the heater line 44. A temperature regulating arrangement 45 controls the amount of steam entering the heater so that the heated fluid exiting through line 41 is at the desired temperature. Steam is supplied through lines 46 and 47 to operate the dual ejector 24.

Figure 2:
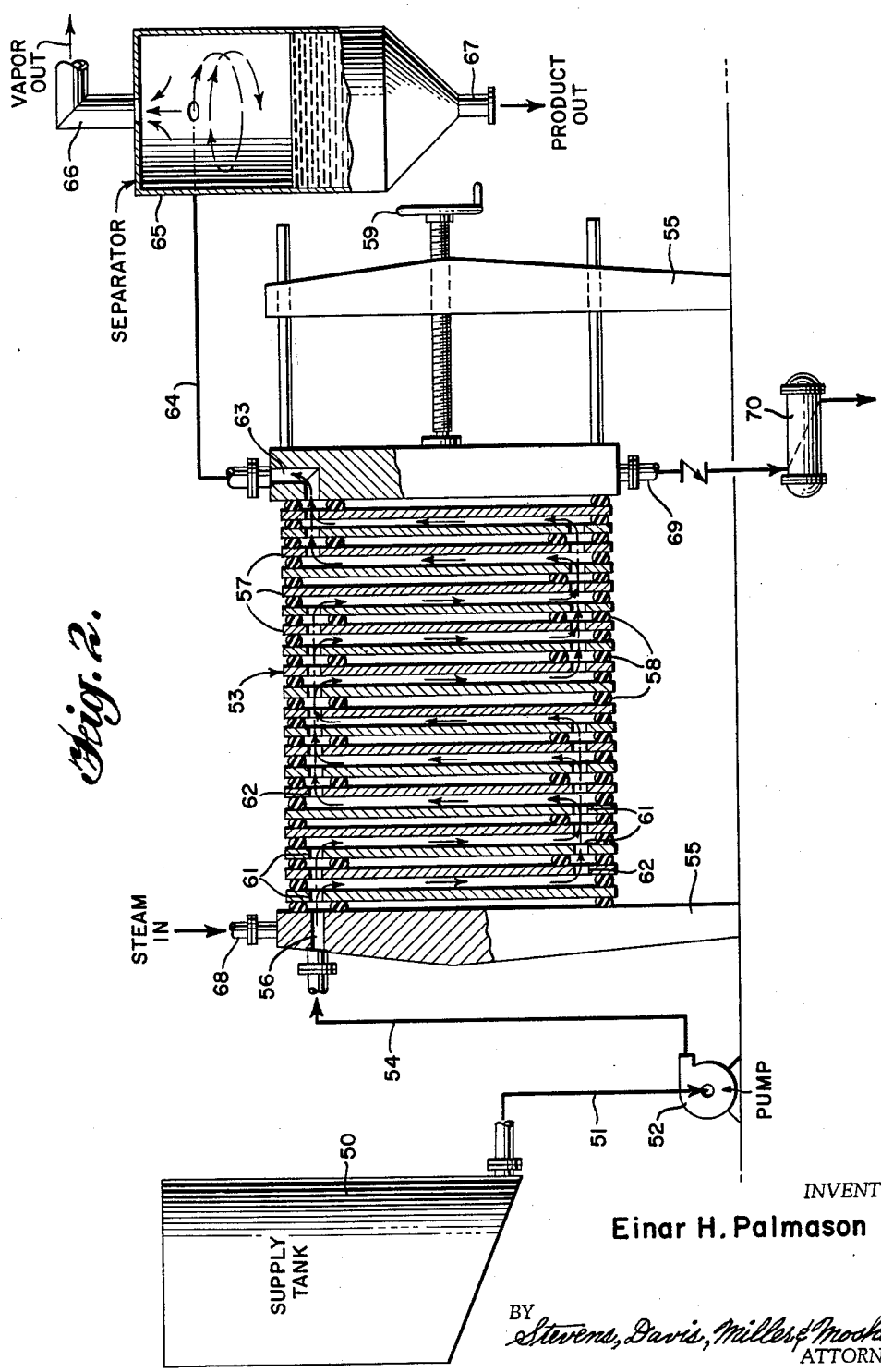
FIGURE 2 is a view of the evaporator system showing in partial cross-section the plate arrangement of a 2–3–3–2 plate sequence for concentrating material passing between the plates.

FIGURE 2 illustrates a single-stage, multiple-pass evaporator system in which the passes are in a 2–3–3–2 arrangement. In such a unit the increase in volume produced by the vaporization between preceding plates can be accommodated without choking the flow of material through the system. Numeral 50 indicates a supply tank of material to be dried, concentrated, or the like. The material in the tank can be in the form of a slurry or a liquid from which volatile component or components are to be removed. In the case of a slurry, it can be agitated to thereby maintain it in a constant consistency. A feed line 51 connects the supply tank with a variable speed feed pump 52 which in turn is connected to a plate-type evaporator designated generally as 53, through feed line 54 which enters the frame 55 thereof through inlet 56. The pump 52 can be of any suitable type capable of continuously supplying under pressure the slurry or liquid to the evaporator.

The evaporator section is formed from a plurality of plates 57 arranged in spaced relationship by gaskets 58. The plates are formed as a compact unit in frame 55 by a compression means 59 which compresses the plates against the respective gaskets 58. This arrangement of plates separated by gaskets defines a plurality of spaces therebetween which are in the form of alternate material and heating medium passageways. The first plate of a pair forming a material passageway has an inlet port 61, and the second plate has an outlet port 62. The outlet ports in multiple-pass plates are in line and exit into a series of inlet ports for the next succeeding pass. By utilization of the gaskets 58, alternate spaces are arranged for the flow of the heating medium, such as steam, hot water, or the like, which is utilized to effect heating of the walls of the spaces forming the material passageway.

The outlet port in the last plate exits into outlet 63 which is connected to line 64 which conveys product to a separator 65. Separator 65 has a vapor overhead take-off line 66 which permits removal of the vapor from it and assures that the pressure therein is lower than the pressure at the exit port of the last plate. The bottom of the separator has a draw-off pipe 67 for removing the dried or concentrated material.

Heat producing medium to effect vaporization of the material being processed between the plates of the evaporator is introduced through a line 68 from which it flows through intersticed alternate spaces between plates to supply continuous heating of the outer surface of the plates defining the material passageway. The spent heat producing medium exits through line 69 and passes through a steam trap 70.

Figure 3:
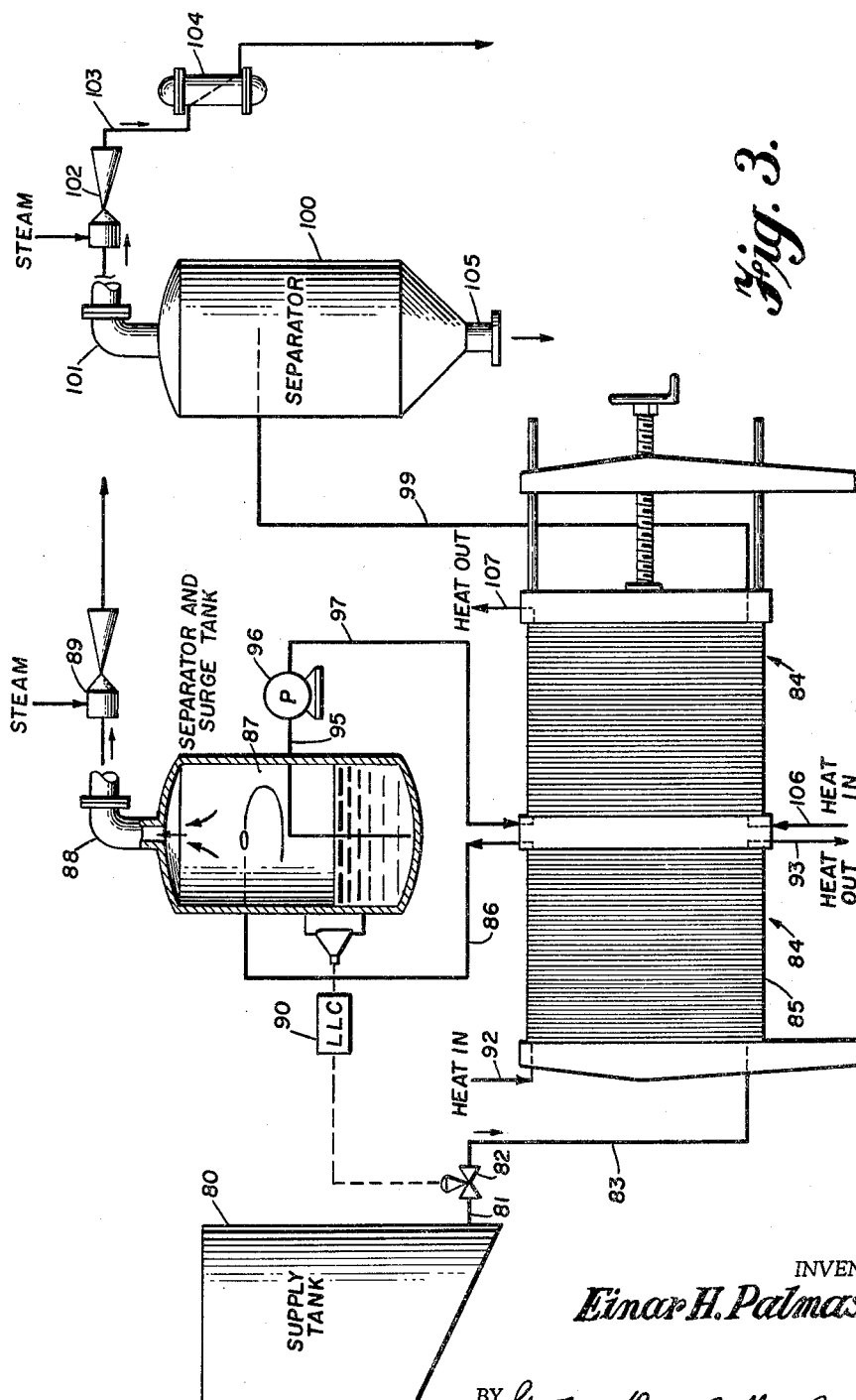
FIGURE 3 is a typical arrangement of a plate-type evaporation system showing a feed mechanism, a two-stage, plate-type evaporator with a vapor flash-off positioned between the stages, and a separator for separating the vapor from the dried material for each stage.

FIGURE 3 illustrates an alternate plate-type evaporator arrangement formed in accordance with this invention. This arrangement has a supply tank 80 with a feed line 81 connected to a conventional diaphragm operated feed valve 82. The head of material in the supply tank is such that it provides the necessary pressure for flow into the evaporator. A feed line 83 connects the valve to the first stage of plate-type evaporator designated generally as 84. Plates 85 of the evaporator, which can be arranged in single or multiple pass or any combination thereof, provide passageways for material and for heating fluid. A line 86 is connected to the exit end of the first stage for conveying material and vapor formed during its passage through that stage to a separator 87. Separator 87 has a vapor discharge pipe 88 mounted in the top portion thereof, which has a suitable pump means 89, such as a steam jet ejector for evacuating the vapor from the separator. The vapor, if desired, may be passed to a condenser unit where heat can be recovered or the vapor, if it is valuable, can be recovered as an overhead product. The separator has a conventional liquid level control device 90 which controls the regulation of valve 82 so that the material in the separator is maintained within specific limits. This liquid level control device assures that a substantially constant amount of material is maintained in separator 87 and eliminates the possibility of a build-up of material therein. The first stage is provided with a heating medium entering through line 92 and exiting from it through line 93 after supplying the necessary heat to the plates in this stage.

A second material supply line 95 extends from the bottom of separator 87 and is connected to a feed pump 96. A feed line 97 connects the exit end of the feed pump 96 to the second stage of the evaporator so that the material from separator 87 can be further concentrated in a manner similar to that of the first stage. The outlet end of the second stage has an exit feed line 99 which conveys material and vapor to a second separator 100. Separator 100 has a vapor discharge pipe 101 mounted on the top portion thereof with an ejector 102 mounted in line 103. Line 103 conveys the vapor from separator 100 to condenser 104. It will be appreciated that the vapors from separator 87 can also be fed to condenser 104 and heat and/or overhead product recovered therefrom in conjunction with those from separator 100. Line 105 provides for discharge of product from separator 100. Heating medium for the second stage enters through line 106 and leaves through line 107. It will be appreciated that the arrangement of the evaporator plates can be single or multiple pass or any combination thereof, as heretofore described in connection with preceding figures.

In referring specifically to FIGURE 4, the plates are shown in an exploded view for convenience of illustrating the flow of material and heating medium between the plates. Each plate, except for the first plate, is shown with a boundary gasket affixed to the face thereof so that when the plates are assembled in operative position the boundary gaskets will define the specific passageways between the adjacent plates, and a ring gasket or gaskets to guide material and heating medium past alternate plates.

In FIGURE 4, the end plate 57A is shown as having two inlet ports, a material inlet port 110 and a heating fluid inlet port 111, both of which are provided with ring gaskets.

Plate 57B, provided with a boundary gasket 58B, is normally placed against the back of plate 57A and will thus provide a passageway for the heating fluid. The direction of flow is indicated by the arrows and the heating fluid flows through opening 111 and thence through a series of corresponding openings 112, 113, 114, 115, 116 and 117, in the series of respective plates 57B, 57C, 57D, 57E, 57F, 57G and 57H, with branch flows upwardly through passages formed by the respective gaskets 58B, 58D, 58F and 58H, and pairs of plates 57A and 57B, 57C and 57D, 57E and 57F, and 57G and 57H.

As the heating fluid flows upwardly between said adjacent plates it passes through outlet ports 118, 119, 120, 121, 122, 123 and 124, which form a composite conduit for the passage of the heating fluid out of the system.

The material entering material inlet port 110 passes through gasketed port 125 in plate 57B and impinges upon the surface of plate 57C and then flows upwardly within the passageway defined by the gasket 58C on plate 57C, and the entire material flow is forced through this chamber and passes outwardly through port 126, after which the material passes directly through ring gasketed port 127 and impinges upon the surface of plate 57E, whereupon it is forced downwardly within the confines of the passageway defined by the gasket 58E between the plates 57D and 57E, and thence through port 128, through ring gasketed port 129 in plate 57F, after which it impinges upon the surface of plate 57G. The material is then forced upwardly within the confines of the passageway defined by the gasket 58G between plates 57F and 57G where it is passed through port 130 and thence through ring gasketed port 131 in plate 57H, which is the discharge port.

From the illustration set forth in FIGURE 4 it will be seen that the direction of flow can be changed to increase and control the section and length of the total product passed.

An evaporator using gasketed plates as described above is arranged in so-called "material" passes where a gasket held between the upstream face of one plate and the downstream faces of the preceding plate guides the material or the mixture of material and generated vapor from an inlet opening at one extremity of one plate to a discharge opening at the opposite extremity of the next adjacent downstream plate. A "heating pass" is shown where the gasket is held between the upstream face of the one plate and the downstream face of the next adjacent plate and guides the heating medium, whether it be steam, water, or any heated fluid between an inlet opening at one extremity of the one plate to an outlet opening at another extremity of the next plate.

Thus, the material pass has heat applied on the opposite side of each of the two plates confining it. This arrangement is advantageous in giving an extremely good relationship in heat transfer surface to mass of material in process, and provides a convenient method of establishing flow cross-section as required for any particular material. For example, material entering one "material pass" can be conveyed directly into two or more "material passes" to the point of discharge.

If a material is robust and will not be adversely affected by high temperatures, and if the concentrate is fluid, substantially all of the volatiles may be driven off the material and separated without foaming by using an open pass arrangement such as a 6–6–6 or 3–7–4. However, where a delicate, heat sensitive material is processed, a 2–3–3–3–2 arrangement may be employed, such as in the case of concentrating latex, gelatin, and the like.

It will be appreciated that the exit port of one set of such plates in face-to-face relationship allows the material to pass into the inlet port of the next set of plates in face-to-face relationship so that the material is intermittently changing direction as it flows through the passageway defined by the plates. This changing of direction, together with the boiling off of vapor, aids in providing turbulent flow of the material and vapor so that a homogeneous flow is effected in which the particles of material are continuously coming in contact with the heated surface of the plates where they are heated to the point that they give off more vapor.

Advantageously, with delicate materials, the sets of plates in face-to-face relationship can be arranged so that the cross-sectional area of the space between the plates near the end of the passageway is less than the cross-sectional area in a portion of the passageway before it, so that the vapor exiting from the passageway is prevented from being isolated from its portion of concentrate before it is actually discharged from the heated zone of the evaporator.

At this final stage in the passageway, substantially all evaporation is completed and the vapors having been formed in the heating zone are superheated relative to the ambient temperatures to discharge port pressures. The degree of superheat in the emerging vapors allows for immediate separation of volatiles from the concentrate without foaming. If conditions of flow and temperature were used which allow the liquid portion still containing volatiles of the material to exit at a temperature as high as, or higher than its vapor, tremendous foaming occurs, which chokes the downstream portion of the system unless extremely large foam traps are used.

Advantageously, the exit port for successive plate passes can be greater in cross-sectional area than the preceding inlet ports between plates for increasing material passageways so that the increase in volume due to vaporization of the volatile component in the material will have less resistance to flow as it passes from one group of plates to the next. This increase in exit port cross-sectional area may be used where the evaporation is taking place under high vacuum conditions.

In general, in the operation of the evaporator (with specific reference to FIGURE 1) the material being concentrated is drawn from supply tank 10 through float valve 12 into feed tank 13 maintained under vacuum, where it mixes with a controlled proportion of concentrated material before being fed via pump 15 through a strainer 17 into the heat exchange passageway 19.

Turbulent flow of the material is rapidly induced by its passage through the extremely small cross-sectional area of the passageway as it contacts the relatively large surface through which heat is passed. Under these conditions, the excellent heat transfer causes the temperature of the material to rise rapidly to a point where vapor is generated. Successive abrupt changes in flow direction are induced as the monogeneous mixture of material and vapor pass from one material pass to the next successive material pass. These changes in direction, together with the velocity being maintained by control of the passageway cross section and vapor generation maintain the vapor in intimate admixture with the concentrate at all times while the material is within the heating zone. This velocity and turbulence insure continued good heat exchange and cause a high degree of volatilization and almost entirely inhibit the deposition of coagulum which normally results from evaporation of a delicate material on a hot surface.

In this manner, the material arrives at the exit port of the evaporation passageway as a concentrate carried in homogeneous mixture by the vapor generated from it. The velocity of this mixture at this stage is extremely high by reason of the great increase in volume, and it discharges tangentially into the separator 21 as a jet or spray where the vapor, which is at a higher temperature than ambient for the pressure in the separator, is separated from the concentrated product without foaming.

The vapors are taken off and condensed to utilize heat or, if valuable in themselves, condensed for storage. The concentrated product is removed from the bottom of the separator by the recycle pump 33 which sends it back to the feed tank 13, after removal by the product pump 37 of the proper proportion of concentrated product.

It will be appreciated that as a result of high turbulence and large liquid surface exposed to high temperature, vapor is generated and made to move concurrently with the liquid as a homogeneous two-phase fluid system. In the passage of this two-phase fluid through the evaporator system, vapor is generated continuously within the heat exchange area. Thus, there is a conversion of sensible heat to latent heat of vaporization which has the effect of continually reducing the temperature of the product which is subject to damage even at relatively modest temperatures with the effect that high heating temperatures may be used without causing such heat damage to the product. For example, product considered to have a critical temperature of 150° F. can be passed through this evaporator system using a heating medium at 230° F. without causing damage to the product. It will be noted that, by reason of the high turbulence induced in this system, the scouring action which takes place continuously prevents any prolonged contact of the thin film or small particles on the hot surfaces. This effectively reduces the particle heat history and also contributes materially to prevention of damage by high temperature. The liquid portion of this two-phase fluid is momentarily super-heated with respect to local pressure. This may be considered the down-stream leg of the evaporating system and the general condition continues until the total product is ready to leave the heat exchange area. At this point, i.e., in the exhaust port, where the material leaves the heat exchange area, a final flashing takes place instantaneously where the super-heated liquid gives off heat for the conversion of volatile material to vapor and the vapor is already superheated because its expansion within a high temperature zone has been accomplished. This combination of conditions presents the two-phase system to the portion of the drying cycle, which we call the separator, where velocities are reduced and heat is no longer being fed into it. The temperature of the concentrated product has therefore dropped to that at which no further evaporation can take place and the velocity of the two-phase fluid is reduced sufficiently to allow the liquid portion to separate through the force of gravity. By the same token, the vapor separates through gravity and as it has a small degree of super-heat at this stage there is no tendency for it to hold the liquid and cause foam. This vapor portion may now be pulled out through a condenser by the vacuum raising equipment and recovered if required. The concentrate is removed from the vacuum system as the desired end product.

The high efficiency of evaporation or concentration by utilization of the plate-type evaporator of this invention is illustrated by the following examples:

EXAMPLE 1

Standard styrene-butadiene copolymer of relatively large particle size using a rosin soap as an emulsifier. Normally concentrated in factory limited to 63–65% total solids because of limiting viscosity of material which could be handled in a standard "flash" evaporation unit was processed and the following physical characteristics and condition were observed:

Heat sensitive at 160° F.
Extremely shear sensitive.
Coagulum forms very readily on heated surfaces, particularly under conditions of evaporation.
Material supplied at 27% total solids.

| | |
|---|---|
| Plate arrangement for evaporator | 2–3–3–3–2. |
| Projected plate evaporator surface | 1.3 sq. ft./treated material interspace. |
| Projected plate evaporator surface per plate pass, i.e., surface per plate pass | 2.6 sq. ft. |
| Liquid volume contained per plate pass | 0.0123 cu. ft. |
| $S/V$ factor, S in square feet and V in cubic feet | 21.0 |
| Total evaporating surface | 33.8 sq. ft. |
| Total evaporator passageway volume | 0.32 cu. ft. |
| Material fed to evaporator | 27% total solids. |
| Feed rate of material to evaporator | 2250 lbs. per hr. |
| Feed pump pressure | 31#/sq." abs. |
| Temperature of product fed | 80° F. |
| Temperature of circulating hot water to evaporator heating passages | 235° F. |
| Approx. capacity of separator | 9 cu. ft. |
| Pressure in separator | 0.95 lbs. p.s.i. abs. |
| Equivalent ambient temperature | 100° F. |
| Temperature of concentrated product out | 100° F. |
| Temperature measured in duct feeding mixture of concentrate and vapor to separator | 120° F. |
| Pressure recorded at same point | 0.95# p.s.i. abs. |
| Rate of evaporation | 439 lbs. per hr. |
| Percentage by weight of water removed per pound of feed material | 19.5%. |
| Rate of evaporation per square foot of evaporator heating surface | 13#/hr. sq. ft. |
| Duration of run | 4 hours. |

Concentrated material was of high quality.

Operation of the evaporator throughout this run was steady and no change in feed pump pressure occurred. No foam or bubbles were observed in the separator. At completion of run the evaporator was opened for inspection and all the evaporator surfaces were found to be clean and clear of coagulum.

EXAMPLE 2

Continuous operation runs were made over periods extending to 25 hours where a latex was fed to the unit at 27% total solids and withdrawn at 60% total solids. The latex was of a styrene-butadiene rubber composition. In this series, concentrated material was recycled as only 17% of the weight of feed was removed per pass, and it was required to remove 56% of the weight of feed stock.

Conditions used:

| | |
|---|---|
| Plate arrangement | 2–3–3–3–2. |
| Heating medium, water at | 230° F. |
| Pressure in separator | 0.95# p.s.i. abs. |
| Feed to evaporator | 2500#/hr. |
| Rate of evaporation | 420#/hr. |
| Rate at which raw feed (27% TSC material) was drawn into system | 765#/hr. |
| Rate of removal of concentrate i.e., 60% total solids | 345#/hr. |

During this run no foaming or pressure build-up occurred and on completion of 25 hours of intermittent run the evaporator plates were found to be clean. Quality of the concentrate was very high.

EXAMPLE 3

Tests were run to concentrate a gelatin glue. This run was continually recycling a portion of the concentrate back to the feed stock which was started at 6% total solids and increased to 52% total solids by the removal of 88% of the water present in the feed stock.

This run was to observe any changes in operating conditions caused by increasing viscosity. During this run feed pump pressures did not noticeably increase until a total solids of 37% was reached. Pump pressure rose steadily thereafter with increasing viscosity until the run was stopped.

Throughout this run, with increasing viscosity, the rate of evaporation remained the same within measuring error.

Conditions used:
Plate arrangement_____ 2-3-3-3-2.
Evaporator surface_____ 33.8 sq. ft.
Heating medium, water at_____ 183° F.
Feed pump rate_____ 2700#/hr.
Rate of evaporation_____ 400#/hr.
Pressure in separator_____ 0.95# p.s.i. abs.
Percent of feed product evaporated per pass_____ 14.8%
Temperature of product from separator_____ 100° F.
Temperature of vapor in exit line__ 112° F.

At the end of the run of 2 hours, when all material was discharged from the evaporator at 52% total solids, the evaporator plates were opened for inspection and found to be clean. No evidence of fall-off of rate of evaporation was noticed during the run and no foam or bubbles were observed in the separator. Quality of the concentrated material was excellent.

The above example would be similar to other food products such as orange juice and other food juices, slurries, or emulsions.

EXAMPLE 4

A series of trials were run where a liquid rubber of viscosity of 25,000 c.p.s., containing 25% water and 25% methanol was to be concentrated to 0.5% total volatiles.

This material was not particularly heat sensitive and not shear sensitive but it did possess high foam forming characteristics under conditions of strong vapor formation.

This material was dried from 55% volatile to 0.5% volatiles in a single pass through the evaporator. In this case the product was maintained at a high enough temperature to keep it mobile.

Conditions used:
Feed rate_____ 1270#/hr.
Percent volatiles in feed_____ 55%
Temperature of feed_____ 150° F.
Heating medium, steam at_____ 300° F.
Evaporator pass arrangement_____ 6-6-6.
Pump feed pressure_____ 30 p.s.i.g.
Rate of evaporation_____ 700 lbs. per hr.
Temperature of product from separator_____ 230° F.
Pressure in separator_____ 0.95# p.s.i. abs.
Duration of run_____ 1½ hrs.

Product was dried at a constant rate, run was smooth and product quality was greatly improved over that obtained from vacuum pan drying due to short heat history.

The above examples were run in a plate-type evaporator as illustrated in FIGURE 1.

EXAMPLE 5

Five runs on a soap slurry having 33 percent by weight of water were made through a one-stage plate-type evaporator similar to that shown in FIGURE 2, having a 2-3-4-2 plate arrangement. The following table presents the results obtained:

| Run No. | 1 | 2 | 3 | 4 | 5 |
|---|---|---|---|---|---|
| Steam pressure, p.s.i.g. | 50 | 63 | 76 | 100 | 119 |
| Steam temperature, °F | 293 | 307 | 317 | 334 | 344 |
| Soap moisture—In, percent | 33 | 33 | 33 | 33 | 33 |
| Soap moisture—Out, percent | 15.6 | 15.8 | 13.6 | 14.4 | 20.4 |
| Time of run, min | 5 | 5 | 5 | 10 | 5.33 |
| Line pressure product in, p.s.i. | 35 | 39 | 39 | 48 | 86 |
| Soap temperature—In, °F | 185 | 187 | 192 | 192 | 192 |
| Soap temperature—Out, °F | 220 | 226 | 228 | 228 | 228 |
| Soap collected, lb | 14.5 | 12.0 | 12.0 | 38.0 | 114.0 |
| B.t.u./hr. sq. ft./°F=U | 24 | 18.3 | 19.0 | 25.5 | 111.0 |
| Wet soap fed/hr. lb | 220 | 181 | 186 | 276 | 1,500 |
| Dry soap fed/hr. lb | 174 | 144 | 144 | 216 | 1,253 |
| Water off/hr./lb | 46 | 37 | 42 | 60 | 242 |

EXAMPLE 6

Orange juice at 12° Brix was fed to the first plate of the plate-type evaporator of this invention at about —10 p.s.i. After passing through the system, it exited from the last plate at about 10 p.s.i. as citrus concentrate of 50° Brix plus vapor. The vapor was removed by a cyclone separator and the concentrate recovered from the bottom. The plates were heated only enough to cause the water in the orange juice to vaporize under the pressure in the system. With efficiencies of this system, destructively high temperatures were avoided, such as is essential to maintaining the value of the product.

Among materials which have been dried or concentrated in accordance with this process and in apparatus similar to that illustrated are:

Corn syrup concentrated from 52% total solids to over 90% total solids.
Waste sulfite liquor concentrated to 82% solids.
Wet lubricating oil dried to anhydrous.
Tallow dried for deodorization.

Excellent and practical results were obtained with each of the above materials. In many cases a marked improvement in quality over accepted standards were observed.

It will be appreciated that the evaporator plates can be of any desired shape or contour to form the evaporation passageway or path, provided the distance between the plates is small compared to the total area of the plate. For example, the plates can be rectangular, as shown in FIGURE 4, or may be of other configurations. Likewise, the temperature of the heating medium employed depends upon the material to be heat treated, the sensitivity to heat of the material, and the various factors that affect the flow and put-through rate of the material in the evaporator.

It will be understood that the apparatus of this invention can be used for many types of unit operation, such as evaporation, distillation, separation, concentration, and the like.

Although the present invention has been described with particularity with reference to preferred embodiments and various modifications thereof, it will be obvious to those skilled in the art after understanding this invention, that various changes and other modifications may be made therein without departing from the spirit and scope of the invention and the appended claims should therefore be interpreted to cover such changes and modifications.

What is claimed is:

1. A continuous process for the evaporation of volatiles, without foaming, from liquid-containing, normally foam-forming materials, whereby rapid isolation of vapors from the concentrated material is permitted, which comprises continuously feeding material to be treated into a tortuous flow path of relatively narrow cross-section, elongated in a direction lateral to the flow of material, said flow path having preselected variations in its cross-section; passing the material through the flow path while supplying heat to release vapor from the material; continuing to pass in homogeneous admixture the concentrated material and its vapors through said flow path while continuing to supply heat thereto, whereby the rate of feed and the aforementioned heat supplied to the material and its vapor according to said preselected variation in cross-section of the flow path effects a high rate of evaporation and a high velocity of the mixture through the flow path thus inhibiting deposition of concentrate upon the surface which defines the flow path; discharging product from the end of the flow path with its vapors hotter than its concentrated material; and thereafter permitting the already separated vapors to be rapidly isolated from the concentrated material.

2. The process of claim 1 in which the material passes through a tortuous flow path having an $S/V$ ratio of at least 8, where $S$ is the heating area in square feet of the evaporating surface per unit of length of the flow path, and $V$ is the volume in cubic feet contained within this surface.

3. The process of claim 1 in which a portion of the discharged concentrated material is recycled and mixed with the material being fed to the evaporator.

4. The process of claim 1 in which the vapor is isolated from the concentrated material at a pressure below atmospheric pressure.

5. The process of claim 1 in which the material to be concentrated is heat sensitive.

6. A continuous process for the evaporation of volatiles, without foaming, from liquid-containing, normally foam-forming material, whereby rapid separation of vapors from the concentrated material is permitted, which comprises feeding the material to be treated through a tortuous flow path defined by a series of connected parallel passageways each of relatively narrow cross-section elongated in a direction lateral to the flow of material; passing the material through the flow path while supplying heat to the passageways to release vapor from the material; continuing to pass in homogeneous admixture the concentrated material and its vapor through said flow path while continuing to supply heat thereto; said material and its vapor being exposed to increasing heating surface for an intermediate portion of the flow path by increasing the number of parallel passageways; and then subjecting the material and its vapor to a decreasing heating surface in the flow path by decreasing the number of parallel passageways, whereby the rate of feed and the aforementioned heat supplied to the material and its vapor according to said increase and decrease in heating surface effects a high rate of evaporation and a high velocity of the mixture through the flow path thus inhibiting deposition of concentrate upon the surfaces which define the passageways; discharging product from the end of the flow path with its vapors hotter than its concentrated material; and thereafter permitting the already separated vapors to be rapidly isolated from the concentrated material.

References Cited in the file of this patent

UNITED STATES PATENTS

| | | |
|---|---|---|
| 485,315 | Yaryan | Nov. 1, 1892 |
| 2,076,597 | Robinson | Apr. 13, 1937 |
| 2,201,616 | Lamont | May 21, 1940 |
| 2,314,966 | Astle | Mar. 30, 1943 |
| 2,451,851 | McCollum | Oct. 19, 1948 |
| 2,562,739 | Risberg | July 31, 1951 |
| 2,710,057 | Bassett et al. | June 7, 1955 |
| 2,872,165 | Wennerberg | Feb. 3, 1959 |
| 2,960,160 | Goodman | Nov. 15, 1960 |
| 2,992,679 | Twaddle | July 18, 1961 |

FOREIGN PATENTS

| | | |
|---|---|---|
| 450,545 | Belgium | June 30, 1943 |